US008839266B1

(12) United States Patent
Partridge et al.

(10) Patent No.: US 8,839,266 B1
(45) Date of Patent: Sep. 16, 2014

(54) INTER-APPLICATION COMMUNICATION ON MOBILE PLATFORMS

(71) Applicant: VMware, Inc., Palo Alto, CA (US)

(72) Inventors: Brian Partridge, Brookline, MA (US); Harish Dhurvasula, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/955,985

(22) Filed: Jul. 31, 2013

(51) Int. Cl.
*G06F 13/00* (2006.01)

(52) U.S. Cl.
USPC .......................................... 719/310; 719/313

(58) Field of Classification Search
CPC ................................. G06F 9/54; G06F 9/546
USPC .................................................. 719/310, 313
See application file for complete search history.

(56) References Cited

U.S. PATENT DOCUMENTS

| 8,443,374 | B2 * | 5/2013 | Li et al. ........................ 719/310 |
| 2006/0168347 | A1 * | 7/2006 | Martin .......................... 709/246 |
| 2014/0096025 | A1 * | 4/2014 | Mandel et al. ................ 715/739 |

OTHER PUBLICATIONS

Apple, Inc., "iOS App Programming Guide", Apr. 23, 2013, pp. 113-135.
Pierce, Greg, "x-callback-url 1.0 DRAFT R1", retrieved on Jul. 30, 2013, 3 pages.
Apple, Inc., "Apple URL Scheme Reference", Dec. 13, 2012 14 pages.

* cited by examiner

*Primary Examiner* — Andy Ho

(57) ABSTRACT

Applications executing in a mobile device utilize a protocol for inter-application communication to overcome restrictions of a sandboxed environment. Applications advertise their exposed capabilities using structured definition files, which are consumed by other applications. Applications can invoke the advertised capabilities by exchanging inter-application communication (IAC) messages in the form of URLs or other platform-specific mechanisms. URL messages are formatted according to parameters and URL schemes specified by the provided definition files.

25 Claims, 4 Drawing Sheets

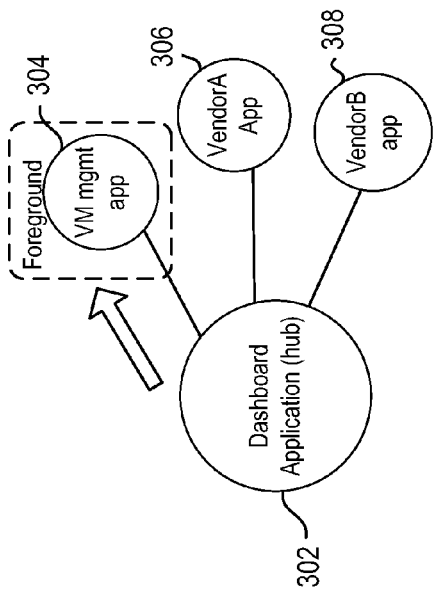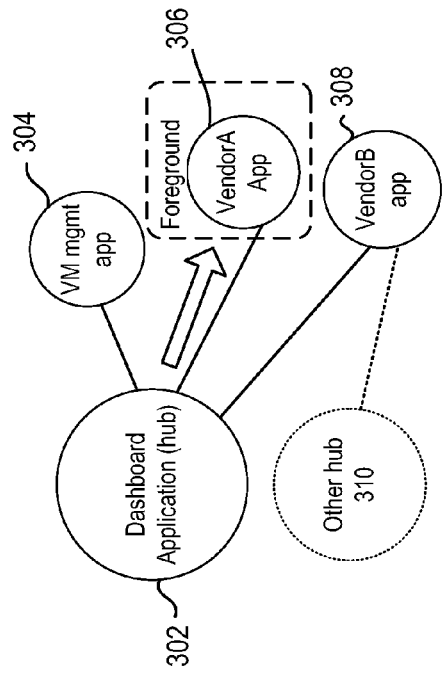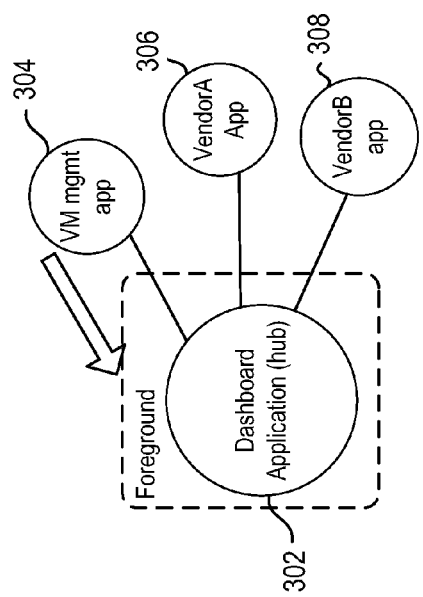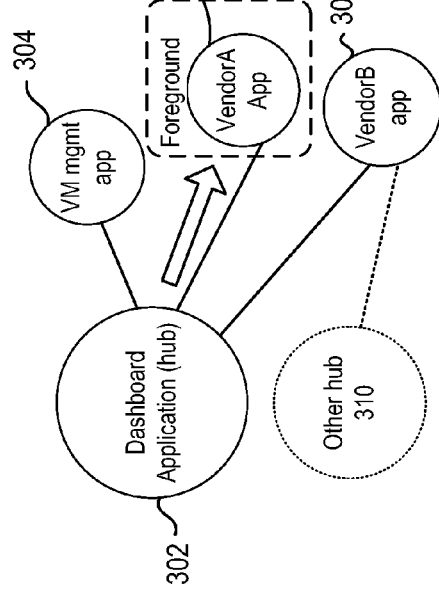

INTER-APPLICATION COMMUNICATION ON MOBILE PLATFORMS

BACKGROUND

Desktop applications are traditionally feature-rich because of available display screen sizes for desktop computers and other hardware capabilities, which encourage developers to provide extensive programming interfaces and to grow to support many use cases and workflows. In many cases, native desktop applications have full access to a user's file system, network-accessible resources, and even the data of other desktop applications. These capabilities have led to several ways in which one application can interact with another application, such as with shared libraries, plug-in systems, etc.

Shared libraries, such as those used by suites of applications, e.g., Microsoft Office suite, enable applications focused on one type of task (e.g., word processing) to have the ability to embed features and content from another application (e.g., spreadsheet), thus seamlessly working as a suite while remaining as independent applications. Plug-in systems integrate external code into another running application, providing complete access to the running process's data and extending functionality. Server management software, such as the VMware vSphere Client for Windows made available by VMware, Inc. of California, provides this type of plug-in functionality, which has enabled both second and third parties to provide advanced functionality by extending the vSphere Client user interface. Additionally, distribution and installation of desktop applications is not limited in any way. Whether read from a disk, downloaded from the Internet, or input from the user, any application code may be executed once it is on a desktop computer.

However, in contrast, applications for mobile devices (i.e., mobile applications) can be limited by the devices on which the mobile applications execute. A smaller screen, compared to desktop computers, means less information can be displayed at once. Less internal storage encourages network connectivity and persisting data within the "cloud" or remote servers. Further, mobile applications tend to run within environments that are much more restrictive than desktop applications. In some cases, mobile applications are distributed through user- or platform-specified channels, which determine whether an application is appropriate for distribution. For example, applications may be downloaded and installed onto a mobile device from an application store (e.g., Android Market, iPhone App Store, Amazon Appstore, various carrier or device manufacturer based application stores, etc.). Some of these channels even require an application review process with humans acting as gatekeepers to ensure quality and acceptability of applications distributed through their platform. Such restrictions provide additional safety and security to users while also imposing different constraints than when producing applications for desktop computers and limiting some functionality.

As such, these restrictions on mobile applications present a challenge when attempting to apply traditional techniques for inter-application communication and operability used for desktop applications to mobile applications.

SUMMARY

One or more embodiments of the present disclosure provide a method, system, and computer-readable storage medium having executable instructions for inter-application communication on a mobile device having an operating system that provides a sandboxed environment. The method includes retrieving, at a first application executing on the mobile device, a definition for an integration point that specifies functionality provided by another application executing on the mobile device. The method further includes determining a second application that implements the integration point is available on the mobile device based on the retrieved definition, and generating a first URL string based on the retrieved definition for the integration point. The first URL string may include at least one parameter specified by the definition for the integration point. The method further includes invoking the integration point by opening the first URL string using a system call of the operating system of the mobile device.

Other embodiments of the present disclosure provide a method, system, and computer-readable storage medium having executable instructions for inter-application communication on a mobile device having an operating system that provides a sandboxed environment. The method includes transmitting, at a first application executing on the mobile device, a definition for an integration point implemented by the first application. The definition specifies a URL scheme associated with the first application. The method further includes registering the URL scheme associated with the first application with the operating system of the mobile device, and receiving a request, from the operating system, to handle opening a first URL string generated by a second application. The first URL string comprises the registered URL scheme and at least one parameter specified by the definition for the integration point. The method further includes executing a handler method associated with the integration point using the at least one parameter specified by the definition for the integration point.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

FIGS. 3A-3D are block diagrams depicting a technique for inter-application communication that includes third-party integration, according to one embodiment of the present disclosure.

DETAILED DESCRIPTION

One or more embodiments disclosed herein provide methods, systems, and computer programs for inter-application communication (IAC) using a messaging protocol between mobile applications executing on a mobile device. The IAC messaging protocol provides a method an application can implement to initiate two-way communication to another application; a method an application can implement to provide integration points for other applications to access, a method for an application to advertise available integration points, and a method for an application to dynamically enable support for available integration points at runtime. Based on knowing which applications are available, an application may present the available capabilities to the end user. Additionally, knowledge of available capabilities allows an application to orchestrate completion of complex tasks and workflows with other applications.

Figure 1:
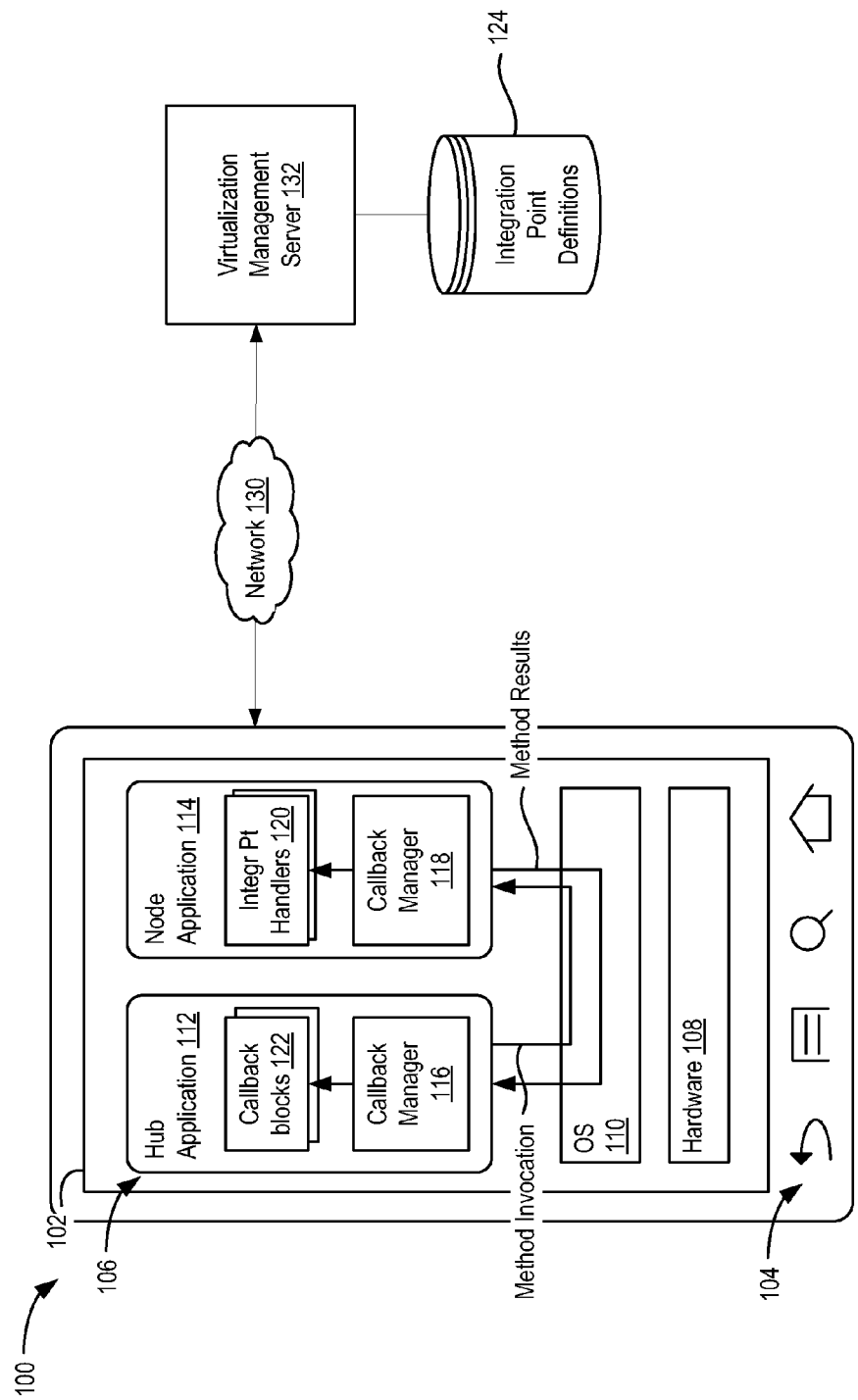
FIG. 1 is a block diagram representative of a mobile device having applications executing thereon, according to one or more embodiments of the disclosure.

FIG. 1 is a schematic illustration of a mobile device 100 according to one or more embodiments of the disclosure. Mobile device 100 may be smartphone, a tablet computing device, and in general any computing device that is portable and configured for wireless connectivity with a network. In the embodiment shown, mobile device 100 includes a display device 102, such as a touch screen, and a plurality of keys 104, and may include other hardware components 108, including conventional computing components such as one or more processing units, memory, storage device(s), and a network interface.

In one embodiment, mobile device 100 includes an operating system (OS) 108 that supports executions of one or more applications 106. Examples of OS 110 include Android™ operating system made available by Google, Inc, or iOS® made available by Apple, Inc of California, although other mobile operating systems may be used. In many cases, mobile applications (e.g., applications 106) tend to run within environments that are much more restrictive than the execution environment for a typical desktop application. OS 110 may execute applications 106 within a sandboxed environment restricts an application's access to outside resources, both in hardware (e.g., regions in memory, networking interface), and in software (e.g., system-level data, state data of other applications). Such restrictions provide additional safety and security to users while also imposing different constraints than when producing applications for desktop computers and limiting some functionality.

OS 110 may limit an application's access to outside resources to only specific, defined interfaces. In such a sandboxed environment, an application 106 may only read and write data to defined locations. This approach prevents an application from writing over or corrupting data belonging to another application. In one embodiment, OS 110 may provide several defined interfaces that are exceptions to sandboxing and allow for some shared data. OS 110 may include a public named region of memory (known in the iOS operating system as a "pasteboard"), which data can be read from or written to by all applications. In some embodiments, OS may include a secure data store (known in the iOS operating system as a "keychain") for persisting small amounts of cryptographic or sensitive data. However, the keychain typically has limited storage space, is not publicly available to all applications, but rather available only to other applications created by the same developer, and usage of the keychain is typically carefully scrutinized by an application review process to prevent misuse.

In one embodiment, OS 110 is configured to limit awareness of external applications and functionality to the use of custom URL (Uniform Resource Locator, sometimes referred to as a Uniform Resource Identifier, or URI) scheme. An application 106 may expose a specific scheme, e.g., "acme-app-1-0:" so that other applications can detect that the scheme is installed and let the user switch to that application to open the URL, while other applications may expose a more generalized scheme, e.g., "define:" or "vnc:" so that external applications looking for an external dictionary or VNC functionality, respectively, can launch to those other applications. Using such an approach, third party applications are able to launch a web browser (e.g., using the URL scheme "http:") or the telephone application (e.g., using the URL scheme "tel:").

According to one embodiment, applications 106 executing on mobile device 100 may be configured to utilize an inter-application communications protocol that enables two-way communication between applications and that allows one application to initiate tasks in another application, even though the applications are executing in a sandboxed environment. In one embodiment, the inter-application communications protocol utilizes a hub-and-spoke architecture which enables applications to communicate and pass state and context between each other as if the applications belong to a suite. According to the embodiment shown in FIG. 1, a central application, referred to herein a "hub" application 112, is configured to initiate two-way communication between one or more other applications, referred to herein as "node" applications 114, using a communication mechanism (i.e., spoke) that are available on a particular mobile platform.

While FIG. 1 depicts one hub application 112 and one node application 114, it should be recognized that mobile device 100 may include more than one hub application 112 and more than one node application 114 configured for inter-application communication. Additionally, while embodiments of the present disclosure describe a mobile application executing on a mobile device, it should be recognized embodiments of the present disclosure are not limited to mobile applications and mobile devices. It should be appreciated that techniques for inter-application communication as described herein may be applied to any computer application operating in a restricted or sandboxed environment where conventional techniques for inter-application or inter-process communication are unavailable.

In one embodiment, any application 106 may act as a node by defining one or more integration points that are accessible over a platform-specific spoke. Integration points of a node application 114 represent functionality made available by node application 114. An integration point corresponds to a method in a node application 114, which is invoked when an inter-application communication (IAC) message is received. Hub application 112 accessing an integration point may be considered analogous to calling a method on a class. Node application 114 is configured to advertise its capabilities to handle one or more integration points by publishing integration point definitions 124 defining the one or more integration points to a central repository or some other shared data area accessible to hub application 112.

At runtime, hub application 112 is configured retrieve integration point definitions 124 from the central repository or other shared data area. Hub application 112 is configured to parse and process integration point definitions 124, and use platform-specific mechanisms to determine whether a node application which implements a defined integration point is available on mobile device 100. When hub application 112 detects that an integration point is available, hub application 112 is configured to dynamically alter its functionality to enable support for the integration point. For example, in some cases, hub application 112 may display a UI element that enables an end user to invoke the integration point, or other cases, hub application 112 may involve the integration point in part of a workflow by out-sourcing one or more operations to the node application. Node application 114 is configured to handle IAC requests from a spoke, mapping the IAC request to one of the implemented integration points, and calling a corresponding method to act upon the IAC request. Once invocation of an integration point concludes, node application 114 is responsible for returning to hub application 112 with successful return data, error details, or a flag indicating the integration point task was aborted. Hub application 112 may then continue operation.

In one embodiment, each hub and node application 112, 114 maintains a singleton reference to a callback manager 116, 118, which handles routing of communication between applications. A hub application 112 invokes a task through callback manager 116, which handles serialization of parameters and transmission of the request. Also, when a hub application invokes a task, several callback blocks 122 are included as a method to retain references to the context of the task and are executed when the task executes. When a node application 114 receives a task, callback manager 118 routes the task to the appropriate method handler 120, which processes the task, and once complete, returns results back through callback manager 118. Accordingly, embodiments of the present disclosure provide a consistent method of providing integration point handlers for node applications. Embodiments of the present disclosure further provide a drop-in callback manager library with limited configuration for communicating over URL schemes. Embodiments also provide a technique for retaining context about initiated tasks through to their completion.

Hub application 112 may include a callback manager 116 configured to handle remote method invocation of node application 114. Callback manager 116 includes program code for exchanging inter-application communication (IAC) messages with a node application 114 using a platform-specific mechanism, i.e., one or more of the limited, exempted resources to the sandboxing environment described earlier. As described in greater detail later, callback manager 116 of hub application 112 is configured to generate a URL string having a custom URL scheme that acts as an IAC message to node application 114, and to process callback URL strings that acts as IAC response messages from node application 114. Node application 114 includes a corresponding callback manager 118 configured to process the remote method invocation using one or more integration point handlers 120. In one particular embodiment, callback manager 118 of node application 114 is configured to process an opened URL string that acts as an IAC from hub application 112, execute one or more of the integration point handlers 120, and generate a callback URL string that acts as an IAC response message to hub application 112.

In one particular embodiment, callback managers 116, 118 may be a packaged library that wraps platform-specific mechanisms for inter-application communication into a developer friendly interface. Callback managers 116, 118 may include methods for invoking integration points of a node application that accept one or more parameters and methods for integration point detection and inspection similar to class reflection. Callback managers 116, 118 may be functionally connected to callback functions, such as callback blocks 122 for hub application 112 and integration point handlers 120 for node application 114. In the embodiment shown in FIG. 1, responsive to IAC requests, node application 114 is configured to call one or more integration point handlers 120 to act upon the IAC request. An integration point handler 120 is associated with a particular integration point and includes application code or logic configured to accomplish a specific task associated with the associated integration point, i.e., implements the functionality of the advertised integration point. For example, an integration point handler 120 corresponding to a "ReverseString" integration point may be a function that accepts a string as a parameter, reverses order of characters within the string, and returns the string. Similarly, callback blocks 122 of hub application 112 may be associated with one or more integration points and may include application code configured to be executed upon completion of the associated integration point. Callback block 122 may be configured to which handle responses to the remote method invocation, for example, by processing data returned in a return result, processing and coordinating changes in state of node applications 114, and other post-processing operations.

In one embodiment, an integration point may have an identifier, required named parameters and data types, optional named parameters and data types, and returned results. Such details of an integration point may be specified by an integration point definitions file 124. In one embodiment, integration point definitions 124 may be represented in a structured definition file having a machine-readable format, such as a JavaScript Object Notation (JSON) file, XML, or other suitable structured formats. An example definition file having integration point definitions 124 for a node application is shown in Table 1 below.

TABLE 1

An example integration point definition file

[{ "bundleIdentifier": "com.example.nodeApp",
    "methods": [{
        "action": "reverseString",
        "actionOptionalParameters": {
            "uppercase": "number"
        },
        "actionRequiredParameters": {
            "string": "string"
        },
        "identifier": "com.example.reverseString",
        "successRequiredParameters": {
            "result": "string"
        },
        "type": "method"
    },
    {"action": "rotateString",
        "actionRequiredParameters": {
            "offset": "number",
            "string": "string"
        },
        "identifier": "com.example.rotateString",
        "successRequiredParameters": {
            "result": "string"
        },
        "type": "method"
    }
    ],
    "name": "MyNodeApp",
    "scheme": "mynodeapp",
    "type": "app"
}]

In one embodiment, integration point definitions file 124 may include identification information about the node application associated with the definition file. Such identification information may include a user-friendly identifier or label (e.g., the "name" field) that specifies the name of node application 114 (e.g., "MyNodeApp"). In other embodiments, the identifiers may further include a platform-specific identifier (known in the iOS operating system as a "bundleIdentifier") that uniquely identifies node application 114 within OS 110. In some cases, mobile platforms may support a variety of ways to display and specify applications, including user-installed applications, widgets, and control panels. In such cases, integration point definitions file 124 may further include a "type" parameter that specifies the type of application associated with the definitions file (e.g., "app").

In one embodiment, integration point definitions file 124 includes platform-specific parameters used to facilitate inter-application communication using platform-specific mechanism. In embodiments using a custom URL scheme to provide inter-application communication, as shown in Table 1, definitions file 124 may include a "scheme" parameter that specifies a custom URL scheme associated with and registered by node application 114 (e.g., "mynodeapp://"). It should be recognized that in some embodiments, the scheme parameter may specify a generalized custom URL scheme (e.g., "stringOps://") associated with the integration points made available by the node application 114, rather than the particular node application itself.

As shown in Table 1, integration point definitions file 124 specify includes definitions of features of the integration points provided by node application 114, for example, in an array of defined methods (e.g., "methods" field). Each integration point described in the methods field may include a user-friendly label (e.g., "action" field) that identifies the integration point in both the calling application (hub) and the called application (node). Each integration point definition may include an internal identifier (e.g., "identifier" field) that uniquely identifies the integration, and, for example, may be referenced by application code of hub application 112 (e.g., executeMethodWithId:@ "com.example.reverseString"). Each integration point definition may further include a list of named required parameters and data types (e.g., "action Required Parameters" field), a list of named optional parameters and data types (e.g., "action Optional Parameters" field), and returned parameters, upon success (e.g., "success Required Parameters" field), error, cancellation, or generally. Analogous to the type field described earlier, each integration point definition may include a type field (e.g., "method") to support other techniques for invoking functionality in node applications.

In one embodiment, a repository of integration point definitions 124 may be hosted at a server communicatively connected to mobile device 100 by a network 130, or in other embodiments, integration point definitions 124 may be accessible in other shared data areas, such as a shared data area on mobile device 100 permitted by OS 110. In the embodiment shown in FIG. 1, the repository of integration point definitions 124 may be hosted at a virtualization management server 132 that manages virtual machines and server infrastructure in a data center. Virtualization management server 132 may include an extension registration mechanism that allows third-party providers to register extension functionality specialized for managing particular components within a datacenter. The extension registration mechanism may be configured to support a hub-and-spoke integration point definition format, as described above. In such an embodiment, hub application 112 may connect to an extension registry at virtualization management server 132 to identify and detect supported node applications installed on the same mobile device 100 using an integration point definitions file 124. The extension registry may directly deliver integration point definitions 124 to hub application 112, or in some embodiments, may re-direct hub application 112 to another server, such as a web server, where integration point definitions may be retrieved.

Figure 2A:
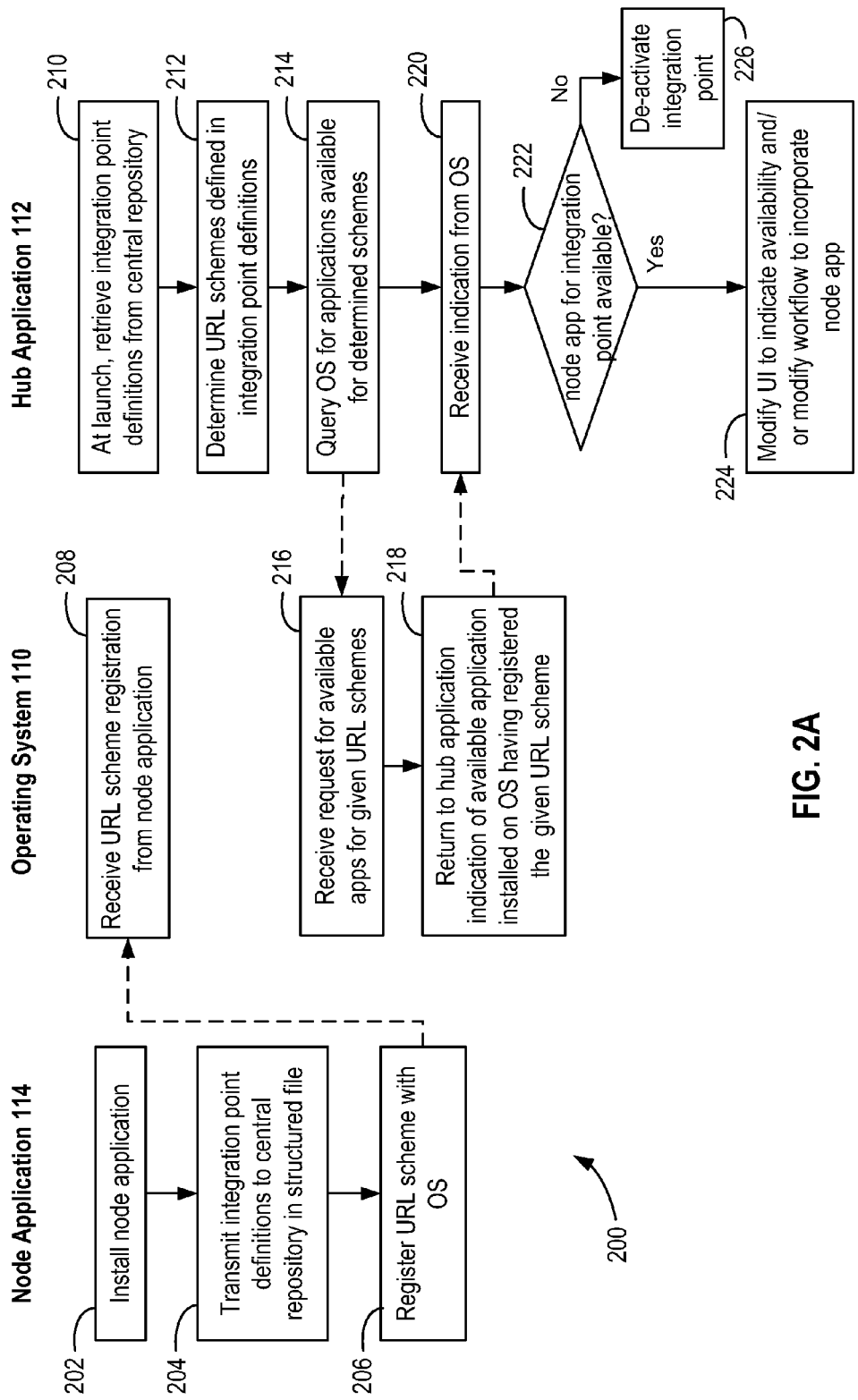
FIGS. 2A and 2B are flow diagrams for a method for inter-application communication, according to one embodiment of the present disclosure.
Figure 2B:
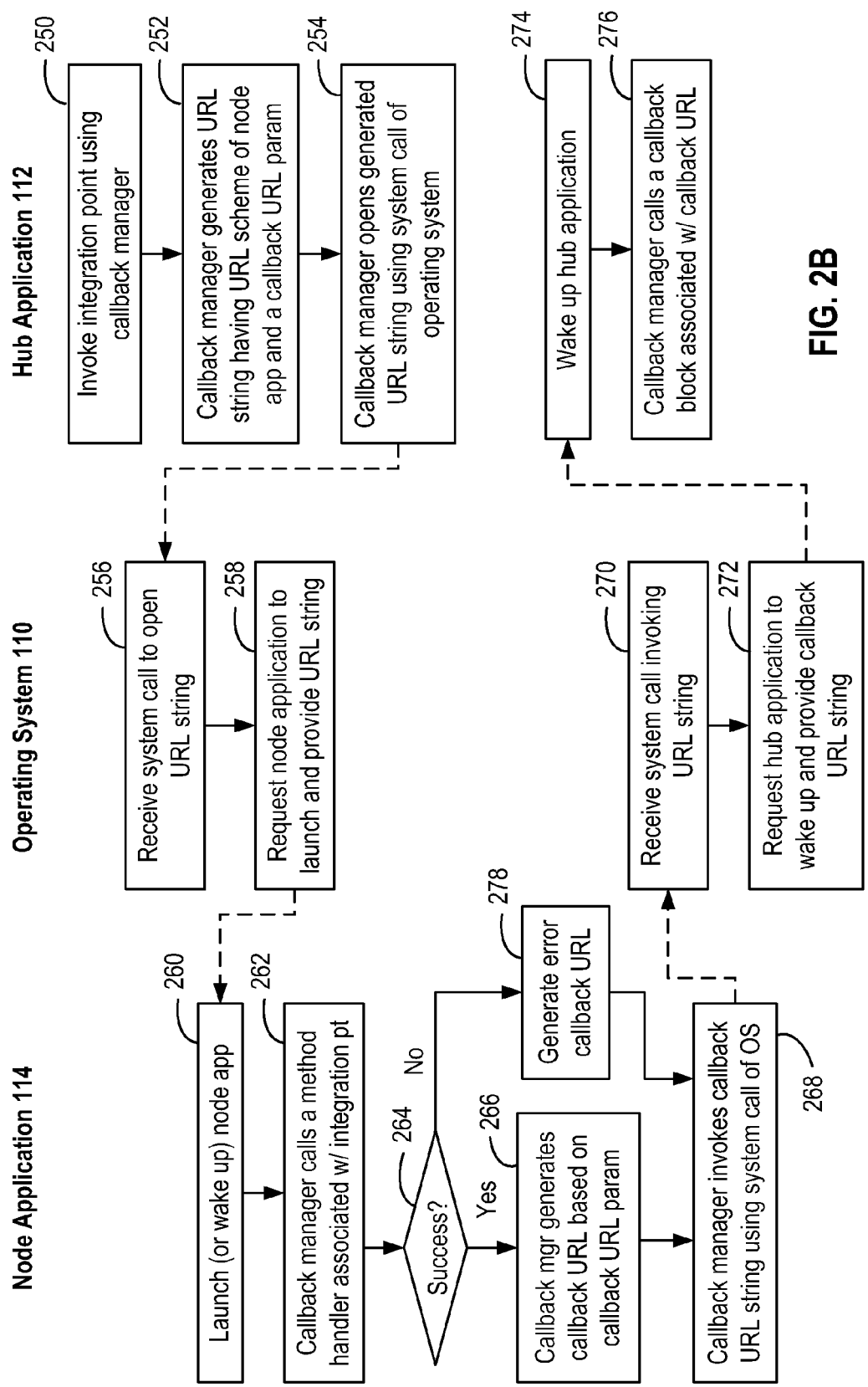

FIGS. 2A and 2B are flow diagrams for a method 200 for providing inter-application communication, according to one embodiment of the present disclosure. While method 200 is described in conjunction with the system depicted in FIG. 1, it should be recognized that other systems may be configured to perform the method described herein.

At step 202, node application 114 is installed on mobile device 100. At step 204, node application 114 transmits one or more integration point definitions 124 to a central repository that is accessible to hub applications. In some embodiments, integration point definitions may be stored in a machine-readable structured file, such as a JSON file, as described earlier. In one embodiment, integration point definitions may be pre-generated and part of the package installed at step 202. In other embodiments, integration point definitions 124 may be dynamically generated and stored in a central repository accessible to hub applications.

At step 206, node application 114 registers capabilities specified by integration points with mobile operating system 110. In one embodiment, node application 114 registers a URL scheme associated with node application 114 with operating system 110. At step 208, mobile operating system 110 receives URL scheme registration from node application 114. In some embodiments, node application 114 may include one or more configuration files (e.g., an array of dictionaries), at least one of which defines a URL scheme matching the custom URL scheme in integration point definitions 124 (e.g., "mynodeapp://"). During installation of node application 114 (e.g., at step 202), OS 110 may parse the configuration file to determine specified URL schemes and register the specified URL schemes with the system.

At some later time, hub application 112 is launched, e.g., in response to user input. At step 210, at launch, hub application 112 retrieves integration point definitions 124 from the central repository, e.g., from virtualization management server 132. It should be recognized that hub application 112 may store or cache integration point definitions within local storage of mobile device 100 for later access.

At step 212, hub application 112 parses the retrieved integration point definitions to determine integration point capabilities that may potentially be available to hub application 112. Hub application 112 determines identifiers, named required parameters and data types, named optional parameters and data types, return results, error codes, and other details for integration points based on the retrieved integration point definitions. Integration point definition 124 may provide information that enables callback manager 116 of hub application 112 to invoke a platform-specific communication mechanism (e.g., spoke). In one particular embodiment, callback manager 116 of hub application 112 determines a URL scheme specified by integration point definition 124 and associated with a particular integration point.

At step 214, callback manager 116 of hub application 112 queries mobile OS 110 for applications available for the determined URL schemes. Callback manager 116 may query mobile OS 110 using one or more system calls provided by mobile OS 110 to identify whether a given URL can be handled by OS 110 or other applications installed on OS 110. In an example using the iOS platform, callback manager 116 formulates a test URL having the URL scheme of the desired integration point, and calls a UIApplication.canOpenURL( ) method with the test URL as a parameter.

At step 216, mobile operating system 110 receives request for available applications for a given URL scheme(s). At step 218, mobile operating system 110 returns an indication of whether they are any available applications installed on OS 110 and that have been registered for the given URL scheme (s). For example, OS 110 may determine that node application 114 previously registered the scheme "mynodeapp://" (e.g., at step 206) and returns a positive (i.e., true, or YES value) result indicating there is an application that can open a given URL scheme. Otherwise, OS 110 may return a negative (i.e., false, or NO value) indicating no application is available that will accept the URL. In an alternative embodiment, rather than a yes/no indication, OS 110 may generate and return a list of available applications installed on OS 110 and that are currently registered for the given URL scheme.

At step 220, hub application 112 receives the indication of available applications for handling the given URL scheme from Os 110, and at step 222, hub application 112 determines whether a node application is available that provides at least one integration point defined in integration point definitions 124 based on the received indication.

At step 224, responsive to determining at least one node application is available, hub application 112 may alter its functionality based on the availability of the node application to invoke an integration point. In some embodiments, hub application 112 may modify a graphical user interface (GUI) to indicate to the user that a node application is available for a given integration point. For example, hub application 112 may generate and display a UI element (e.g., icon, badge, button) that, when activated or pressed, invokes the integration point. The UI element may have an appearance corresponding to an icon for node application 114. In some embodiments, hub application 112 may modify one or more workflows to incorporate the integration point of node application 114. For example, hub application 112 may include application logic that conditionally invokes an integration point if a node application 114 is available, and otherwise, performs another operation within hub application 112.

At step 226, responsive to determining no node application is available, hub application 112 may de-activate the integration point. For example, in some embodiments, callback manager 116 of hub application 112 may mark a state of an integration point as "inactive" and raise an error or exception if hub application 112 attempts to invoke the inactive integration point. In some embodiments, hub application 112 may modify the GUI to "grey-out" or render inactive an existing UI element (e.g., icon, badge, button) to indicate to the user that no node application is available for one or more integration points. Operations for method 200 are continued in FIG. 2B.

As shown in FIG. 2B, at step 250, hub application 112 invokes an integration point using callback manager 116. In some embodiments, hub application 112 may call a method of callback manager 116 that accepts an identifier associated with an integration point, as specified by integration point definition 124. For example, hub application 112 may use a method call to a handleInvocation( . . . ) method of callback manager 116 and pass an integration point identifier "com.example.reverseString" specified by the integration point definitions shown in Table 1. As such, callback manager 116 provides a simple interface for developers to create hub applications that invoke integration points, and reduces the cost of writing application code that uses a platform-specific mechanism to invoke the integration point.

In one embodiment, in addition to passing the handleInvocation( ) method an integration point identifier, hub application 112 may pass additional parameters for the integration point, as specified by integration point definition 124. Continuing the "ReverseString" example, hub application 112 may include a value for the required "string" parameter, and another value for the optional "uppercase" parameter, as specified by the integration point definition in Table 1. In one embodiment, callback manager 116 of hub application 112 may perform parameter checking on the additional passed parameters based on the integration point definition. Callback manager 116 may check if a parameter has been given for each of the list of named required parameters (i.e., required parameter checking), and whether each required or optional parameter has a data type specified by the integration point definition (i.e., parameter type checking).

At step 252, callback manager 116 of hub application 112 generates a URL string that acts as an inter-application communication (IAC) message to node application 114. The generated URL string is configured such that OS 110 opens the generated URL string using node application 114, thereby passing context, state data, and other information from hub application 112 and node application 114. The generated URL string may be formatted according to known URL formats, for example, according to syntax for Uniform Resource Identifiers (URIs) specified in RFC 3986. In one embodiment, the generated URL string may have the format shown in Table 2 below, although other suitable formats or syntaxes may be utilized.

<scheme_name>://<path_part>/
   <action_name>?<query_string>#<fragment_id>

Table 2: An Example URL Format

In the embodiment shown in Table 2, the URL string has a scheme_name portion which is the URL scheme of the invoked integration point, as defined by integration point definition 124. For example, an IAC message formatted based on the integration point definition shown in Table 1 may have the scheme identifier "mynodeapp://". The URL scheme in the URL string acts as a destination field indicating the IAC message is intended for any node application implementing the integration point. In some embodiments, the action_name portion of the URL string may be an identifier for integration point as specified by integration point definition 124. Again using the example shown in Table 1, an IAC message may have the action_name "com.example.reverseString" for invoking the ReverseString integration point. In an alternative embodiment, the URL string may have a path_part portion that is the unique identifier (e.g., "com.example.reverseString") and an action_name portion that is the user-friendly identifier (e.g., "reverseString") for an integration point, although other schemes may be used.

In one embodiment, the generated URL string includes a query string component that contains required and optional named parameters as specified by the integration point definition. The query string component may specify one or more name-value pairs, for example, separated by ampersands (e.g., key1=value1&key2=value2&key3=value3). In some embodiments, parameter values within the query string component may be encoded, serialized, or transformed to comply with URL syntax rules and constraints, including restrictions on character encodings, escaping reserved characters, and character limits. The query string component of the URL string contains data for the IAC message, as well as IAC-related parameters used to facilitate inter-application communication.

In one embodiment, callback manager 116 generates a query_string component for the URL string that contains parameters for named required parameters and named optional parameters based on integration point definition 124. In some embodiments, callback manager 116 determines parameters specified by the fields within definition 124, such as, "actionRequiredParameters" and "actionOptionalParameters" and generates appropriate name-value pairs. In the example of Table 1, callback manager 116 generates a query string component for the "reverseString" integration point having key-value pairs for the "string" required parameter and the "uppercase" optional parameter (e.g., "?string=abc123&uppercase=1").

Callback manager 116 may generate a query string component of the URL string that includes parameters that identify hub application 112 and may be used to return to hub application 112 after invocation of an integration point is completed. In one embodiment, the query string component of the URL string may include a "source name" parameter that provides the name of hub application 112 (e.g., for display within node application 114 for user experience purposes). While specific names of parameters (e.g., "source_name") are described for sake of example, it should be recognized that any suitable labels or parameter names may be used according to techniques described herein. It should be further recognized that parameter names used by callback manager 116 may include a reserved prefix (e.g., "cm-" as in "cm-return-success") to avoid namespace conflicts with integration point parameters.

In one embodiment, callback manager 116 generates a query string component of the URL string that includes a callback URL parameter specifying a URL to open to return to hub application 112 upon completion of the action requested by the integration point. The callback URL parameter may include pre-determined parameters and variables encoded and appended as its own query string. In one embodiment, callback manager 116 may generate a callback URL having a custom scheme identifier that is unique to hub application 112, such that opening the callback URL returns to hub application 112 and not any other applications installed on mobile device 100. In some embodiments, the custom scheme identifier may be machine-generated to be unique across all applications installed on mobile device and avoid possible scheme collisions. Accordingly, the callback manager advantageously takes care of platform-specific logistics, such as generating an appropriate callback URL or including a unique scheme identifier, thereby reducing time and costs in software development for inter-application communication.

In some embodiments, a number of separate parameters for callback URL may be specified for use in different scenarios depending on the results of invoking the integration point. For example, a "return success" callback URL parameter may be specified within the query string component and is opened by node application 114 upon successful completion of the integration point invocation. Similarly, a "return error" callback URL parameter may be specified within the query string component to be opened by node application 114 if the invoked integration point generates an error or exception. In another example, a "return cancel" callback URL parameter may be specified to be opened by node application if the invoked integration point is cancelled by user action, e.g., if node application 114 offers the end user the option to cancel the requested action.

In some embodiments, callback manager 116 may generate a query string component of the URL string that includes a "continue" URL parameter specifying a URL to open to launch another application (i.e., not necessarily return to hub application 112) upon completion of the action requested by the integration point. The continue-URL parameter may specify a plurality or an array of URLs that should be opened in sequence, upon success of each integration point. At each step, a node application is responsible for popping the URL that the node application opens off of the top of the array, and inserting any returned values into the continue-URLs so that state data and returned results are persisted through the workflow and the URL is prepared when executed later. In such embodiments, the continue-URL parameters may include templating language that is parsed and processed by each node application for inserting results into the URLs for subsequent steps. Accordingly, hub application 112 can supply URLs for each step of an operation up front and orchestrate a whole operation all at once. Use of a "continue" URL parameter advantageously reduces context switching by enabling each node application to initiate a next step directly rather than having to return to the hub application. Further, use of the "continue" URL reduces the need of a node application to maintain state while waiting for another node application to return, thereby simplifying operations.

In one embodiment, callback manager 116 may assign a task identifier to a particular invocation of the integration point and generate a query string component of the URL string that includes the task identifier parameter, for example, with a "task_id" parameter. While in some cases, operations performed on mobile operating system 110 may be inherently synchronous, as a single application appears in the foreground at any one time, certain situations of asynchronous operations between node and hub applications can arise. For example, a node application, while handling an integration point invocation, may initiate an asynchronous task on a server (e.g., backup a target virtual machine) and then the node application might leave the foreground while this task is still processing. In some cases, the user might even return to the hub application to initiate another operation while the previous operation is still processing. According, in such embodiments, callback manager 116 uses separate task identifiers to differentiate these operations, and to distinguish which operation might be invoking the callback URL (e.g., the second operation completes before the first operation). In some embodiments, the task identifier may be a unique identifier across all hub and node applications on mobile device 100.

In one embodiment, callback manager 116 may generate a URL string that includes a "version" parameter specifying a version of the integration point being invoked. In some cases, hub application 112 and node applications 114 may be running in a mixed system where a hub application supports a newer API or integration point than the node applications, or vice versa. In such situations, callback manager 116 may incorporate versioning when invoking an integration point to prevent versioning issues. Callback manager 116 may determine the version of the integration point using the integration point definition file. In some embodiments, callback manager 116 may generate a query string component of the URL string that includes a "version" parameter, or in other embodiments, callback manager 116 may generate a URL string having a URL scheme identifier that incorporates a version number within (e.g., "mynodeapp-v1.0:// . . . ")

Referring back to FIG. 2B, at step 254, callback manager 116 of hub application 112 invokes the generated URL string using one or more system calls provided by OS 110 to open a resource at a specified URL. For example, in embodiments using the iOS platform, callback manager 116 may call the UIApplication.openURL( ) method with the generated URL string as a parameter. Callback manager 116 opens the generated URL string and control flow passes to OS 110 for handling of the opened URL.

At step 256, OS 110 receives the system call to open a resource located at the generated URL string. At step 258, OS 110 requests a node application 114 that previously registered to handle that URL scheme to launch and provides the URL string. In one particular embodiment, OS 110 passes the URL string to a delegate of node application 114 for handling.

At step 260, responsive to request from OS 110, node application 114 launches, or wakes up, in cases where node application 114 has been dormant. At step 262, a callback manager 118 of node application 114 processes the URL string provided by OS 110 to extract the component portions of the provided URL string, including the scheme name, path, action name, and query string portions, as described in detail earlier. Callback manager 118 determines the integration point referenced by the URL string and calls an integration point handler 120, or method handler, mapped to the corresponding integration point. In one embodiment, callback manager 118 calls an integration point handler 120 based on matching the action name portion of the URL string to an integration point identifier (e.g., "com.example.reverseString"). Example pseudo-code of node application 114 for handling an invocation is shown in Table 3 below.

TABLE 3

An example pseudo-code for handling an invocation

```
-(void) handleInvocation:(CMInvocation *)invocation {
    if([invocation.method.identifier isEqualTo:
    @"com.example.reverseString"]) {
        ActionViewController *vc = appDelegate.viewController;
        [vc handleInvocation:invocation];
    }
}
```

At step 264, callback manager 118 of node application 114 determines whether execution of integration point handler 120 completed successfully. If so, at step 266, responsive to determining execution was a success, callback manager 118 generates a callback URL string based on the callback URL parameter provided by the received URL string. In one embodiment, callback manager 118 of node application 114 generates a callback URL based on the callback URL parameter found in the query string component of the received URL string. As described earlier, the callback URL parameter may include pre-determined parameters and variables encoded and appended as its own query string.

In one embodiment, callback manager 118 may use the return-success callback URL provided by the callback URL parameter and add additional parameters in the query string component. Callback manager 118 includes one or more parameters containing results returned from integration point handler 120 as returned data, as specified by integration point definition 124. Using the example in Table 1, upon completion of the ReverseString method, callback manager 118 appends the query string "?result=321cba" (or "&result=321cba" if there already is a query string) to the callback URL. In one embodiment, callback manager 118 may include the task identifier parameter (i.e., task_id) associated with the invocation of the integration point and provided by the received URL string, in order to allow hub application 112 to distinguish which operation the callback URL is returning from. It should be recognized that in some embodiments the task identifier parameter may have been pre-generated and already be included as part of the callback URL parameter provided by the received URL string.

If, at step 278, responsive to determining execution was not completed successfully, callback manager 118 generates a callback URL string based on a return-error callback URL parameter provided by the received URL string. In some embodiments, callback manager 118 uses the return-error callback URL and adds additional parameters in the query string component specifying an error code, an error description, and other information (e.g., "?errorCode=12513253&errorMessage=NoMoreMemory").

In embodiments having an array of URLs (i.e., continue-URL parameter) that specify a workflow through a plurality of node applications, node application 114 generates a callback URL to continue to a next one of the plurality of node applications, rather than return to the original hub application. In such embodiments, node application 114 takes the next URL from the array of URLs and generates a callback URL based on the taken URL. The generated callback URL retains the continue-URL parameter in the query string portion, but with the taken URL removed from the array of URLs. In some embodiments, node application 114 parses templating language found within the query string portion of the taken URL and replaces the templating language with parameter values for use by the reset of the plurality of node applications.

At step 268, callback manager 118 of node application 114 opens the generated callback URL string using a system call provided by OS 110, similar to the system call used by hub application 112 in step 254. At step 270, OS 110 receives the system calling opening the callback URL string, and at step 272, OS 110 requests hub application 112 to wake up and provides the callback URL string to the hub application. In some embodiments, a delegate of hub application 112 receives the callback URL string and signals to hub application 112 to wake up.

At step 274, hub application 112 wakes up, and moves to the foreground. At step 276, callback manager 116 of hub application 112 processes the callback URL by extracting information from portions of the callback URL string, such as scheme identifier, host, action, and parameters from a query string portion of the received callback URL string. In some embodiments, callback manager 116 extracts the task identifier parameter (e.g., task_id) from a query string portion of the callback URL and determines the task from which the callback is returning. In one embodiment, callback manager 116 of hub application 112 calls a callback block 122 associated to the callback URL.

One example of inter-application communication can be described in context of hub and node applications that allow a user to manage virtual machines and server components in a data center. A mobile dashboard application that provides an overview of virtual machines and server components and that manages virtualization operations, such as a vCenter Operations for iPhone app made available by VMware, Inc., can be integrated with a mobile VM management application that provides deeper views into the virtualized environment, such as a vSphere Client for iOS app made available by VMware, Inc. Such integration enables context sharing between the applications, such as where viewing a virtual machine in the dashboard application can launch into the VM management application to see more environment-specific details about a particular virtual machine. In another example, the dashboard application can retrieve single sign-on authentication tokens from the VM management application. A user could initiate remediation of virtual machines and server components in the VM management application, for example, by initiating a virtual machine power operation, or taking a snapshot of a virtual machine, or performing a VM migration, using the VM management application.

As such, complete workflows can be performed through integration between applications rather than requiring a user to manually jump between applications and mentally carry contexts to each step. Consider on example workflow, where a user might receive an alert notification via e-mail on their mobile device about trouble in the data center. The user launches into the dashboard application from the e-mail client, directly to the alert, views the alert details, and takes ownership of the problem. After completing their analysis, the dashboard application launches into the VM management application, passing the context of the problematic virtual machine via IAC message. The VM management application launches directly into the troublesome virtual machine and initiates a restart. After monitoring completion of the restart and verifying the virtual machine is running properly, the user is returned to the dashboard application where they may message their supervisor that the problem has been resolved.

As such, embodiments of the present disclosure provide support for retrieving advertised integration points from a server, enabling dynamically adding and removing capabilities from an application based on its environment (i.e., whether node application are available in the environment). This support enables applications developed by one developer to integrate with other applications developed by third parties. For example, one developer might provide a virtualization management server (e.g., virtualization management server 132) that has an extension registration mechanism that allows third-party providers to register extension functionality specialized for managing particular components within a datacenter. The extension registration mechanism may be configured to support a hub-and-spoke integration point definition format, as described earlier.

FIGS. 3A-3D are block diagrams depicting inter-application communication that includes third-party integration, according to one embodiment of the present disclosure. FIG. 3A depicts relationships and communication among a plurality of applications 300, which includes hubs and nodes, installed on the same mobile device 100. The plurality of applications 300 includes a mobile dashboard application 302 that provides an overview of virtual machines and server components and that manages virtualization operations, as described earlier. Applications 300 further includes a mobile VM management application 304 that enables a user to view individual performance of a virtual machine, start/stop/suspend virtual machines, reboot physical hosts, and other operations. Third party providers may provide mobile applications with some domain-specific functionality, such as ordering spare parts, or datacenter configuration. In the example shown, Vendor A and Vendor B are companies that provide data center equipment, such as servers, network switches, storage arrays, etc., and provide specialized mobile applications 306, 308 for managing their respective products.

Dashboard application 302 (i.e., hub application), shown in FIG. 3A as executing in the foreground, identifies that third-party providers have registered extensions indicating various capabilities using the extension registry. For example, Vendor A has registered extensions advertising the capability to look up warranty information for Vendor A's equipment, and Vendor B has registered extensions advertising the capability to provide access to knowledge base article for specific products of Vendor B. Knowing these capabilities, dashboard application 302 presents two workflows to the user: (1) "Check Vendor A warranty", and (2) "Troubleshoot Vendor B host".

Once a workflow is initiated, dashboard application 302 launches VM management application 304, and passes an IAC message indicating that the user needs to pick a host to operate on. As shown in FIG. 3B, VM management application 304 moves to the foreground of execution within OS 110. Within VM management application 304, a host-picker interface is presented to the user.

Once a host is selected by the user, focus automatically returns to dashboard application 302, as shown in FIG. 3C, where dashboard application 302 initiates a next step in the workflow by launch either Vendor A's application 306 or Vendor B's application 308, depending upon the selected workflow, as shown in FIG. 3D. These steps may repeat until the workflow is complete, when the user will be automatically returned back to dashboard application 302 (i.e., hub application). Each workflow execution can be uniquely identified to track progress by the hub, for example, using a task identifier parameter, described earlier. Use of the task identifier parameter also enables resilience in the event that a phase of a workflow is cancelled or abandoned mid-execution. Accordingly, by loosely associating hub and node applications, an ecosystem of applications can be very dynamic. New nodes and capabilities can be added and removed to a mobile device at any time. Additionally, it should be recognized that each node can support multiple hub-based eco-systems, such as another hub 310 depicted in FIG. 3D.

Although one or more embodiments of the present invention have been described in some detail for clarity of understanding, it will be apparent that certain changes and modifications may be made within the scope of the claims. For example, while embodiments herein have referred to certain mobile operating systems such as iOS, it should be recognized that any mobile operating systems may be utilizing in alternative embodiments such as Google's Android, Research in Motion's Blackberry OS, Microsoft's Windows Phone, Hewlett Packard's webOS, Symbian, Java, and the like. Similarly, embodiments herein may have referred to certain functions and components using terminology more common used in certain mobile operating systems as compared to others (e.g., custom URL scheme, pasteboard, foreground, etc.). It should be recognized that use of such terminology is merely exemplary not meant to limit the scope of the teachings herein to any particular operating system and that corresponding functions and components in other operating system platforms may benefit from the teachings herein. Further, while the present disclosure describes one particular mechanism for inter-application communication that uses custom URL schemes, it should be recognized that the communication mechanism (i.e., spoke) may be platform-specific and therefore different on each mobile platform. However, embodiments of the present disclosure provide a protocol that uses a standard definition of capabilities that may be used across various types of mobile platforms. Such a protocol may encourage second- and third-party integration using mobile applications developed by other parties, as described earlier.

The embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for inter-application communication on a mobile device having an operating system that provides a sandboxed environment, the method comprising:
    retrieving, at a first application executing on the mobile device, a definition for an integration point that specifies functionality provided by another application executing on the mobile device;
    determining a second application that implements the integration point is available on the mobile device based on the retrieved definition;
    generating a first URL string based on the retrieved definition for the integration point, wherein the first URL string comprises at least one parameter specified by the definition for the integration point; and
    invoking the integration point by opening the first URL string using a system call of the operating system of the mobile device.

2. The method of claim 1, further comprising:
    registering a URL scheme for the first application with the operating system of the mobile device;
    modifying the first URL string to include a callback URL parameter having the URL scheme for the first application; and
    receiving a request, from the operating system, to handle opening a second URL string, wherein the second URL string is generated based on the callback URL parameter and is responsive to the opening of the first URL string.

3. The method of claim 1, wherein the receiving the definition for the integration point further comprises:
    retrieving a structured file specifying a plurality of integration point definitions from a central repository accessible to the first application and to the second application.

4. The method of claim 1, wherein the determining the second application that implements the integration point is available on the mobile device based on the retrieved definition further comprises:
    determining a URL scheme identifier associated with the integration point based on the definition for the integration point; and
    determining the URL scheme identifier is registered with the operating system of the mobile device.

5. The method of claim 1, further comprising:
    responsive to determining the second application that implements the integration point is available on the mobile device, executing a workflow that includes invocation of the integration point at the second application based on the definition of the integration point.

6. The method of claim 1, wherein the first URL string comprises a task identifier parameter associated with invocation of the integration point and assigned by the first application.

7. The method of claim 1, wherein the first URL string comprises a plurality of callback URLs specifying a plurality of integration points to be executed upon success of the integration point.

8. A method for inter-application communication on a mobile device having an operating system that provides a sandboxed environment, the method comprising:
    transmitting, at a first application executing on the mobile device, a definition for an integration point implemented by the first application, wherein the definition specifies a URL scheme associated with the first application;
    registering the URL scheme associated with the first application with the operating system of the mobile device;
    receiving a request, from the operating system, to handle opening a first URL string generated by a second application, wherein the first URL string comprises the registered URL scheme and at least one parameter specified by the definition for the integration point; and
    executing a handler method associated with the integration point using the at least one parameter specified by the definition for the integration point.

9. The method of claim 8, wherein the transmitting the definition for the integration point further comprises:
    transmitting a structured file specifying a plurality of integration point definitions to a central repository accessible to the first application and the second application.

10. The method of claim 8, wherein the first URL string comprises a task identifier parameter associated with the invocation of the integration point and assigned by the second application.

11. The method of claim 8, further comprising:
    determining the first URL string comprises a callback URL parameter associated with the second application;
    generating a second URL string based on the callback URL parameter and based on the definition for the integration point; and
    invoking a return to the second application by opening the second URL string using a system call of the operating system of the mobile device.

12. The method of claim 11, wherein the second URL string comprises a task identifier parameter extracted from the first URL string and associated with the invocation of the integration point.

13. The method of claim 8, further comprising:
  determining the at least one parameter of the first URL string comprises a plurality of callback URLs;
  determining a next URL of the plurality of callback URLs;
  generating a second URL string based on the next URL, wherein the second URL string comprises a parameter specifying the plurality of callback URLs excluding the next URL; and
  invoking a second integration point by opening the second URL string using a system call of the operating system of the mobile device.

14. A non-transitory computer-readable storage medium comprising instructions that, when executed in a computing device, for providing inter-application communication on a mobile device having an operating system that provides a sandboxed environment, by performing the steps of:
  retrieving, at a first application executing on the mobile device, a definition for an integration point that specifies functionality provided by another application executing on the mobile device;
  determining a second application that implements the integration point is available on the mobile device based on the retrieved definition;
  generating a first URL string based on the retrieved definition for the integration point, wherein the first URL string comprises at least one parameter specified by the definition for the integration point; and
  invoking the integration point by opening the first URL string using a system call of the operating system of the mobile device.

15. The non-transitory computer-readable storage medium of claim 14, further comprising:
  registering a URL scheme for the first application with the operating system of the mobile device;
  modifying the first URL string to include a callback URL parameter having the URL scheme for the first application; and
  receiving a request, from the operating system, to handle opening a second URL string, wherein the second URL string is generated based on the callback URL parameter and is responsive to the opening of the first URL string.

16. The non-transitory computer-readable storage medium of claim 14, wherein the receiving the definition for the integration point further comprises:
  retrieving a structured file specifying a plurality of integration point definitions from a central repository accessible to the first application and to the second application.

17. The non-transitory computer-readable storage medium of claim 14, wherein the determining the second application that implements the integration point is available on the mobile device based on the retrieved definition further comprises:
  determining a URL scheme identifier associated with the integration point based on the definition for the integration point; and
  determining the URL scheme identifier is registered with the operating system of the mobile device.

18. The non-transitory computer-readable storage medium of claim 14, wherein the first URL string comprises a task identifier parameter associated with the invocation of the integration point and assigned by the first application.

19. The non-transitory computer-readable storage medium of claim 14, wherein the first URL string comprises a plurality of callback URLs specifying a plurality of integration points to be executed upon success of the integration point.

20. A non-transitory computer-readable storage medium comprising instructions that, when executed in a computing device, for providing inter-application communication on a mobile device having an operating system that provides a sandboxed environment, by performing the steps of:
  transmitting, at a first application executing on the mobile device, a definition for an integration point implemented by the first application, wherein the definition specifies a URL scheme associated with the first application;
  registering the URL scheme associated with the first application with the operating system of the mobile device;
  receiving a request, from the operating system, to handle opening a first URL string generated by a second application, wherein the first URL string comprises the registered URL scheme and at least one parameter specified by the definition for the integration point; and
  executing a handler method associated with the integration point using the at least one parameter specified by the definition for the integration point.

21. The non-transitory computer-readable storage medium of claim 20, wherein the transmitting the definition for the integration point further comprises:
  transmitting a structured file specifying a plurality of integration point definitions to a central repository accessible to the first application and the second application.

22. The non-transitory computer-readable storage medium of claim 20, wherein the first URL string comprises a task identifier parameter associated with the invocation of the integration point and assigned by the second application.

23. The non-transitory computer-readable storage medium of claim 20, further comprising:
  determining the first URL string comprises a callback URL parameter associated with the second application;
  generating a second URL string based on the callback URL parameter and based on the definition for the integration point; and
  invoking a return to the second application by opening the second URL string using a system call of the operating system of the mobile device.

24. The non-transitory computer-readable storage medium of claim 23, wherein the second URL string comprises a task identifier parameter extracted from the first URL string and associated with the invocation of the integration point.

25. The non-transitory computer-readable storage medium of claim 20, further comprising:
  determining the at least one parameter of the first URL string comprises a plurality of callback URLs;
  determining a next URL of the plurality of callback URLs;
  generating a second URL string based on the next URL, wherein the second URL string comprises a parameter specifying the plurality of callback URLs excluding the next URL; and
  invoking a second integration point by opening the second URL string using a system call of the operating system of the mobile device.

* * * * *